US011311830B2

(12) United States Patent
Cheng

(10) Patent No.: US 11,311,830 B2
(45) Date of Patent: Apr. 26, 2022

(54) UPRIGHT TWO-STAGE DUST COLLECTOR

(71) Applicant: San Ford Machinery Co., Ltd., Taichung (TW)

(72) Inventor: Yuan-Tai Cheng, Taichung (TW)

(73) Assignee: SAN FORD MACHINERY CO., LTD., Taichung (TW)

( * ) Notice: Subject to any disclaimer, the term of this patent is extended or adjusted under 35 U.S.C. 154(b) by 266 days.

(21) Appl. No.: 16/785,393

(22) Filed: Feb. 7, 2020

(65) Prior Publication Data
US 2021/0245080 A1   Aug. 12, 2021

(51) Int. Cl.
*B01D 46/00*   (2006.01)
*B01D 46/24*   (2006.01)

(52) U.S. Cl.
CPC ..... *B01D 46/0024* (2013.01); *B01D 46/0005* (2013.01); *B01D 46/0045* (2013.01); *B01D 46/0065* (2013.01); *B01D 46/2411* (2013.01); *B01D 2265/027* (2013.01)

(58) Field of Classification Search
CPC ............ B01D 46/0024; B01D 46/0005; B01D 46/0045; B01D 46/0054; B01D 46/2411; B01D 2265/027; B01D 35/30; B01D 46/0023; B01D 46/0039; B01D 50/002; B01D 45/00; B01D 46/00

USPC .................. 55/296, 307, 337, 456, 331, 320
See application file for complete search history.

(56) References Cited

U.S. PATENT DOCUMENTS

| 5,753,000 A * | 5/1998 | Chiu | F24F 1/0071 55/357 |
| 6,171,356 B1 * | 1/2001 | Twerdun | A47L 9/1608 15/347 |
| 8,978,199 B2 * | 3/2015 | Kasper | A47L 9/1683 15/347 |

* cited by examiner

*Primary Examiner* — Robert A Hopkins
*Assistant Examiner* — Qianping He
(74) *Attorney, Agent, or Firm* — Sinorica LLC

(57) ABSTRACT

An upright two-stage dust collector includes a base unit, a suction blower unit, a filter unit and a dust collecting unit. The suction blower unit has a suction blower body. The filter unit includes a filter body, a coarse particle dust filter cartridge disposed in the filter body, and a fine particle dust filter element disposed in the coarse particle dust filter cartridge. The fine particle dust filter element is coaxially inserted in the coarse particle dust filter cartridge. The air after the first dust collection is filtered by the fine particle dust filter element to perform the second dust collection. Through the combination of the above units, in addition to a two-stage dust collecting effect, the dust collector occupies less space and can be used conveniently.

10 Claims, 16 Drawing Sheets ary chamber 221. The lower end of the filter body 22 has a cone portion 223 which is in communication with the accommodating chamber 221 and located above the first dust collecting cylinder 25. The air guide duct 23 is a hollow, upright cylinder. The outer peripheral wall surface of the air guide duct 23 corresponds in position to the intake passage 222. After the air blower 24 is operated to generate a suction force, outside air is sucked into the accommodating chamber 221 through the intake passage 222, and the air hits the outer wall of the air guide duct 23 to be guided to the cone portion 223. In the process of the air in contact with the wall surfaces of the air guide duct 23 and the cone portion 223, coarse particles of dust will fall into the first dust collecting cylinder 25 due to their own weight, thereby achieving the first dust collection. After the first dust collection, the air is attracted by the air blower 24 to pass through the air guide duct 23 and then enter the filter cartridge 26. The filter cartridge 26 is composed of a filter material with micropores on its surface. The finer particles of dust in the air are filtered by the filter cartridge 26 and fall into the second dusting cylinder 27, thereby achieving the second dust collection. Through the above-mentioned second dust collection, the two-stage dust collector 20 can filter out coarse and fine particles of dust in the air, which can effectively improve the overall filtering effect. The structure of the above-mentioned two-stage dust collector 20 does make the air quality more effective in filtering and cleaning. However, it still has some shortcomings. The conventional two-stage dust collector 20 is a combination of the filter body 22 in cooperation with the first dust collecting cylinder 25 and the filter cartridge 26 in cooperation with the second dust collecting cylinder 27. The two sets of filter mechanisms are arranged individually, which causes the entire two-stage dust collector 20 to occupy a larger space and area. For a factory with a limited space, it is a problem to accommodate the two-stage dust collector 20. Besides, because the volume of the dust collector is too large, it is quite troublesome to transport or assemble the dust collector. In addition, the cleaning work of the first and second dust collecting cylinders 25, 27 also needs to be processed separately, which is time-consuming and laborious for users.

Accordingly, the inventor of the present invention has devoted himself based on his many years of practical experiences to solve these problems of the excessively large volume and poor usability of the conventional two-stage dust collector 20

UPRIGHT TWO-STAGE DUST COLLECTOR

FIELD OF THE INVENTION

The present invention relates to a dust collector, and more particularly to an upright two-stage dust collector that saves the space of the dust collector and can be used conveniently by installing the units of the dust collector in an upright manner.

BACKGROUND OF THE INVENTION

Referring to FIG. 1, a conventional one-stage dust collector 10 mainly comprises a base 11, a suction blower body 12 disposed on the base 11, a filter cartridge 13 installed beside the suction blower body 12, and a dust collecting bag 14 connected to the lower end of the filter cartridge 13. The exterior of the suction blower body 12 is provided with an air inlet 121 for introducing outside air. One side of the suction blower body 12 is provided with an air duct 122 connected to the filter cartridge 13. An air blower (not shown) capable of generating suction is provided inside the suction blower body 12. After the air blower is started, the outside air is sucked into the filter cartridge 13 via the air inlet 121. The filter cartridge 13 is a filter material with predetermined pores on its surface. When outside air enters the filter cartridge 13, foreign particles in the air will be filtered by the filter cartridge 13 and will fall downward into the dust collecting bag 14. The filtered air is directly diffused through the pores of the filter cartridge 13 to the outside, thereby achieving a one-stage dust collection effect. Although the above-mentioned dust collector 10 has a simple structure and occupies a small space and is convenient for operation, the dust collector 10 can only filter out coarse particles of dust in the air according to the size of the pores of the filter cartridge 13. The finer particles of dust in the air will pass through the filter cartridge 13 to the outside. Therefore, the overall filtration effect is not good. If the user changes to use a filter cartridge 13 with smaller pores, after a period of use, the pores of the filter cartridge 13 will be blocked by coarse and fine particles of dust, resulting in a reduction in filtering efficiency. The user needs to clean up the dust adhered to the filter cartridge 13 frequently, which causes trouble in use.

Therefore, a two-stage dust collector is developed accordingly to improve the shortcomings of the one-stage dust collector. Referring to FIG. 2, a conventional two-stage dust collector 20 mainly comprises a base 21, a filter body 22 disposed on the base 21, an air guide duct 23 fixed inside the filter body 22, an air blower 24 disposed above the filter body 22, a first dust collecting cylinder 25 disposed below the filter body 22, a filter cartridge 26 disposed beside the base 21 and connected to the filter body 22, and a second dust collecting cylinder 27 disposed below the first filter cartridge 26. The interior of the filter body 22 is hollow to form an accommodating chamber 221. The exterior of the filter body 22 is provided with an intake passage 222 for introducing outside air into the accommodating chamber 221. The lower end of the filter body 22 has a cone portion

SUMMARY OF THE INVENTION

The primary object of the present invention is to provide an upright two-stage dust collector, which provides a suction blower unit, a filter unit and a dust collecting unit that are installed in an upright manner to minimize the volume of the entire dust collector, so that the present invention can be appropriately placed in a small space and has convenience in installation, transportation and operation.

Another object of the present invention is to provide an upright two-stage dust collector, which provides a coarse particle dust filter cartridge and a fine particle dust filter element that are coaxially arranged inside a filter body, allowing the dust collection of coarse and fine particles to be completed in the single filter body. Besides, coarse and fine particles of dust can be centrally processed by a single dust collecting cylinder, which can effectively save the cost of the dust collector and achieve the effect of convenient cleaning.

A further object of the present invention is to provide an upright two-stage dust collector, which provides a filter element cleaning mechanism above the filter unit. The user stands at the front of the dust collector and manually operates the filter element cleaning mechanism to perform a flapping and cleaning action on the fine particle dust filter element, thereby achieving the effect of convenient cleaning of the filter element.

A yet further object of the present invention is to provide an upright two-stage dust collector, which provides a first quick-release mechanism at middle portions of two posts, so that the filter unit can be removed and installed quickly and conveniently, thereby facilitating replacement of the fine particle dust filter element.

A yet further object of the present invention is to provide an upright two-stage dust collector, which provides a second quick-release mechanism at lower portions of the two posts, so that the dust collecting unit can be removed and installed quickly and conveniently, thereby facilitating replacement of a dust collecting bag.

In order to achieve the above objects, the present invention provides an upright two-stage dust collector, comprising a base unit, a suction blower unit, a filter unit, and a dust collecting unit. The base unit includes a base and two posts uprightly disposed on left and right sides of the base. The suction blower unit includes a suction blower body disposed at upper ends of the two posts and an air blower disposed inside the suction blower body. A bottom of the suction blower body is formed with a suction passage corresponding in position to the air blower. Starting the air blower enables the suction passage to generate a negative pressure suction force. The filter unit includes a filter body disposed between the two posts and under the suction blower body, a coarse particle dust filter cartridge disposed in the filter body, and a fine particle dust filter element disposed in the coarse particle dust filter cartridge. An interior of the filter body is hollow to form a first accommodating chamber. An exterior of the filter body is provided with an air inlet communicating with the first accommodating chamber for introducing outside air. The coarse particle dust filter cartridge is mounted and fixed in the filter body. A lower end of the coarse particle dust filter cartridge is provided with a cylindrical portion extending into the first accommodating chamber. An interior of the cylindrical portion is hollow to form a second accommodating chamber. An outer peripheral surface of the cylindrical portion is formed with a plurality of filter hole groups communicating with the second accommodating chamber. A center of an upper end of the coarse particle dust filter cartridge is formed with a seat hole. An upper end of the seat hole communicates with the suction passage. The fine particle dust filter element is coaxially inserted in the seat hole. A filter material surrounds an outer periphery of the fine particle dust filter element. An interior of the filter material is hollow to form a core hole. A lower end of the core hole communicates with the second accommodating chamber. The dust collecting unit includes a dust collecting cylinder disposed between the two posts and under the filter body. An interior of the dust collecting cylinder is formed with a dust collecting chamber corresponding in position to the first and second accommodating chambers.

Preferably, the filter unit further includes a filter element cleaning mechanism. The filter element cleaning mechanism has an annular seat disposed at an upper end of the filter body, a shaft that is axially disposed at a center of the annular seat and extends downward to the core hole of the fine particle dust filter element, a cleaning piece that is fixedly connected to a lower portion of the shaft and is in contact with an inner surface of the filter material, a one-way bearing disposed at an upper end of the shaft, and a manual trigger that is fitted on the one-way bearing and laterally extends out of the annular seat.

Preferably, the annular seat is a ring-shaped seat body. An interior of the annular seat is formed with a perforation having a substantially ¾ circular arc shape, upper and lower ends of the perforation communicate with the suction passage and the seat hole respectively, the interior of the annular seat is provided with a solid portion having a substantially ¼ circular arc shape. A central angle end of the solid portion is formed with a shaft hole through which the shaft passes. An outer periphery of the solid portion is formed with a groove for the manual trigger to make a swing greater than 45 degrees.

Preferably, a spiral deflector is fixedly connected to an inner wall of the first accommodating chamber of the filter body. The filter hole groups on the cylindrical portion of the coarse particle dust filter cartridge are spirally distributed corresponding in direction to the deflector.

Preferably, a lower end of the cylindrical portion of the coarse particle dust filter cartridge is provided with a flared beveled conical portion.

Preferably, a center of a bottom of the seat hole is formed with an intermediate through hole communicating with the second accommodating chamber.

Preferably, the coarse particle dust filter cylinder has a positioning flange protruding from a bottom of the seat hole for airtight fit of a bottom end of the fine particle dust filter element.

Preferably, the fine particle dust filter element has a filter element frame and a retaining disc. The filter material is arranged around an outer periphery of the filter element frame, so that the core hole is formed inside the fine particle dust filter element. The retaining disc is locked at an upper end of the filter element frame to close an upper end of the core hole. The fine particle dust filter element is locked and fixed to the coarse particle dust filter cartridge by the retaining disc.

Preferably, left and right sides of the filter body are provided with two ears. The base unit further includes a first quick-release mechanism. The first quick-release mechanism includes two first slide rails that are uprightly disposed on inner sides of the two posts and correspond in height to the filter body, two first slide sleeves that are respectively sleeved onto the first slide rails to move up and down, two first convex shafts that are respectively connected to inner sides of the first slide sleeves and can be inserted into the two ears of the filter body, two first elastic members that are respectively sleeved onto the first slide rails and provide an elastic force to the first slide sleeves, a first manual lever extending outward to an outside of the filter unit and having two ends pivotally connected to the first slide sleeves, and two first links connected between the first slide rails and the first manual lever.

Preferably, left and right sides of the dust collecting cylinder are provided with two ears. The base unit further includes a second quick-release mechanism. The second quick-release mechanism includes two second slide rails that are uprightly disposed on inner sides of the two posts and correspond in height to the dust collecting cylinder, two second slide sleeves that are respectively sleeved onto the second slide rails to move up and down, two second convex shafts that are respectively connected to inner sides of the second slide sleeves and can be inserted into the two ears of the dust collecting cylinder, two second elastic members that are respectively sleeved onto the second slide rails and provide an elastic force to the second slide sleeves, a second manual lever extending outward to an outside of the dust collecting cylinder and having two ends pivotally connected to the second slide sleeves, and two second links connected between the second slide rails and the second manual lever.

Embodiments of the present invention will now be described, by way of example only, with reference to the accompanying drawings.

DETAILED DESCRIPTION OF THE PREFERRED EMBODIMENTS

Figure 1:
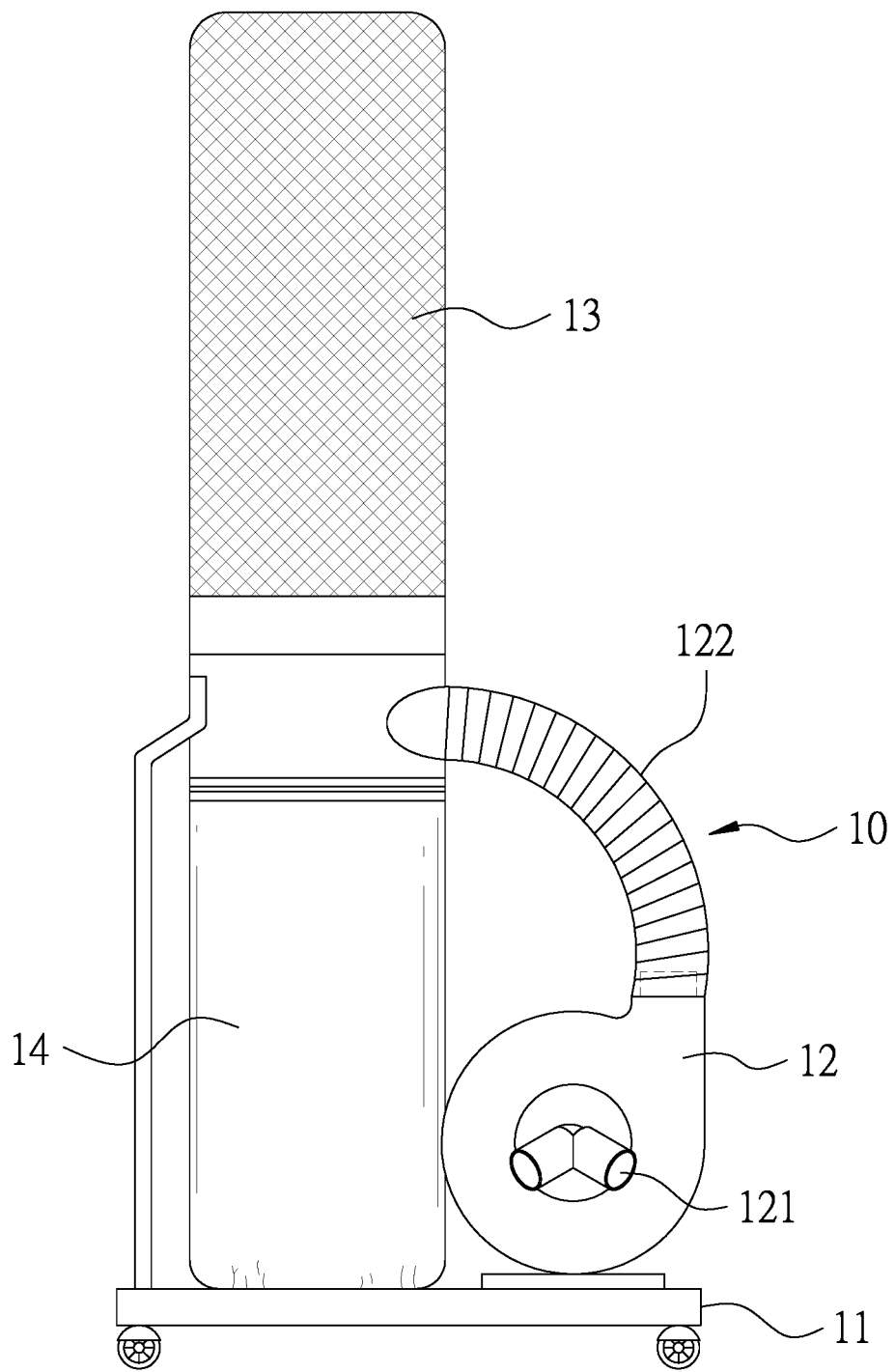
FIG. 1 is a schematic view of a conventional dust collector.
Figure 2:
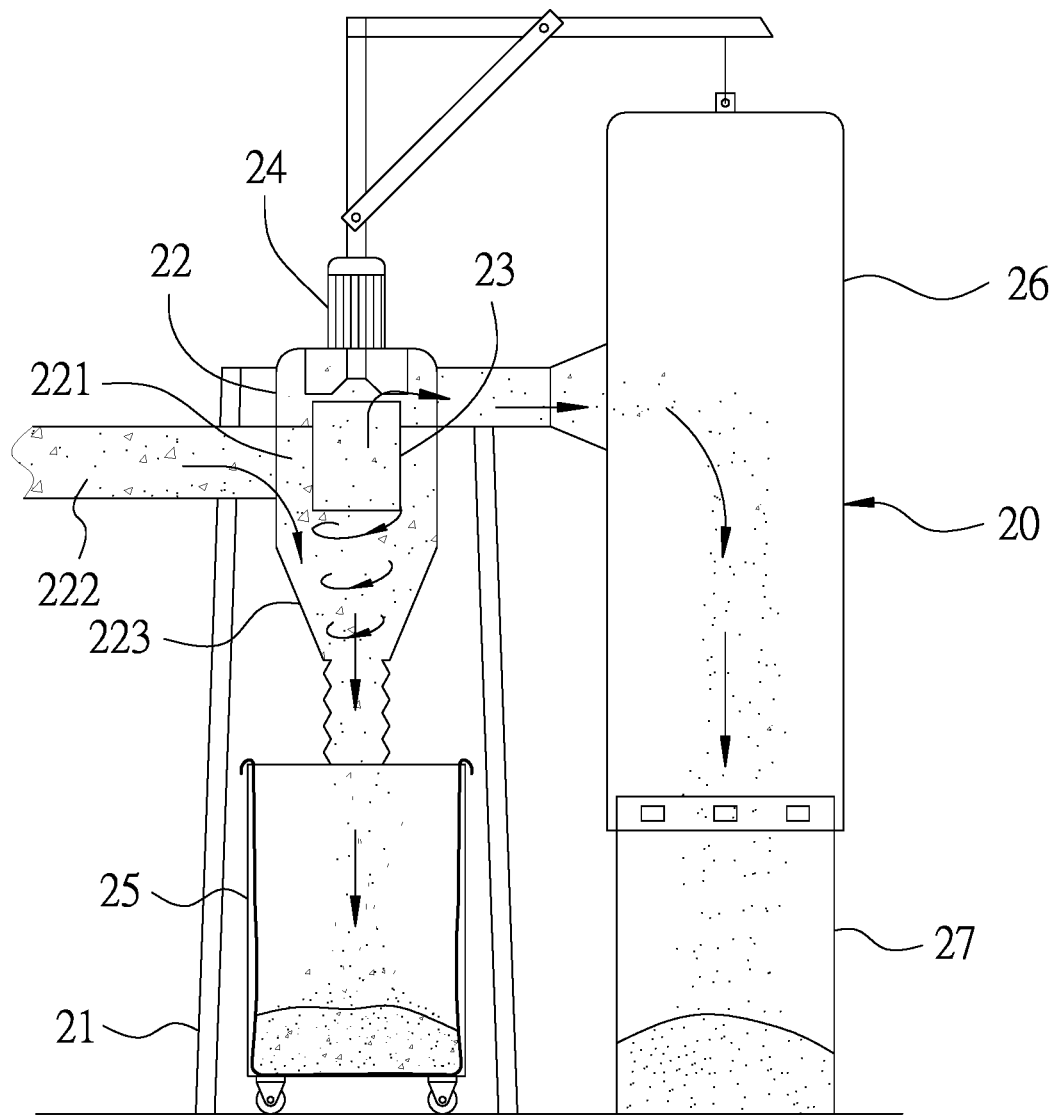
FIG. 2 is a cross-sectional view of a conventional two-stage dust collector.
Figure 3:
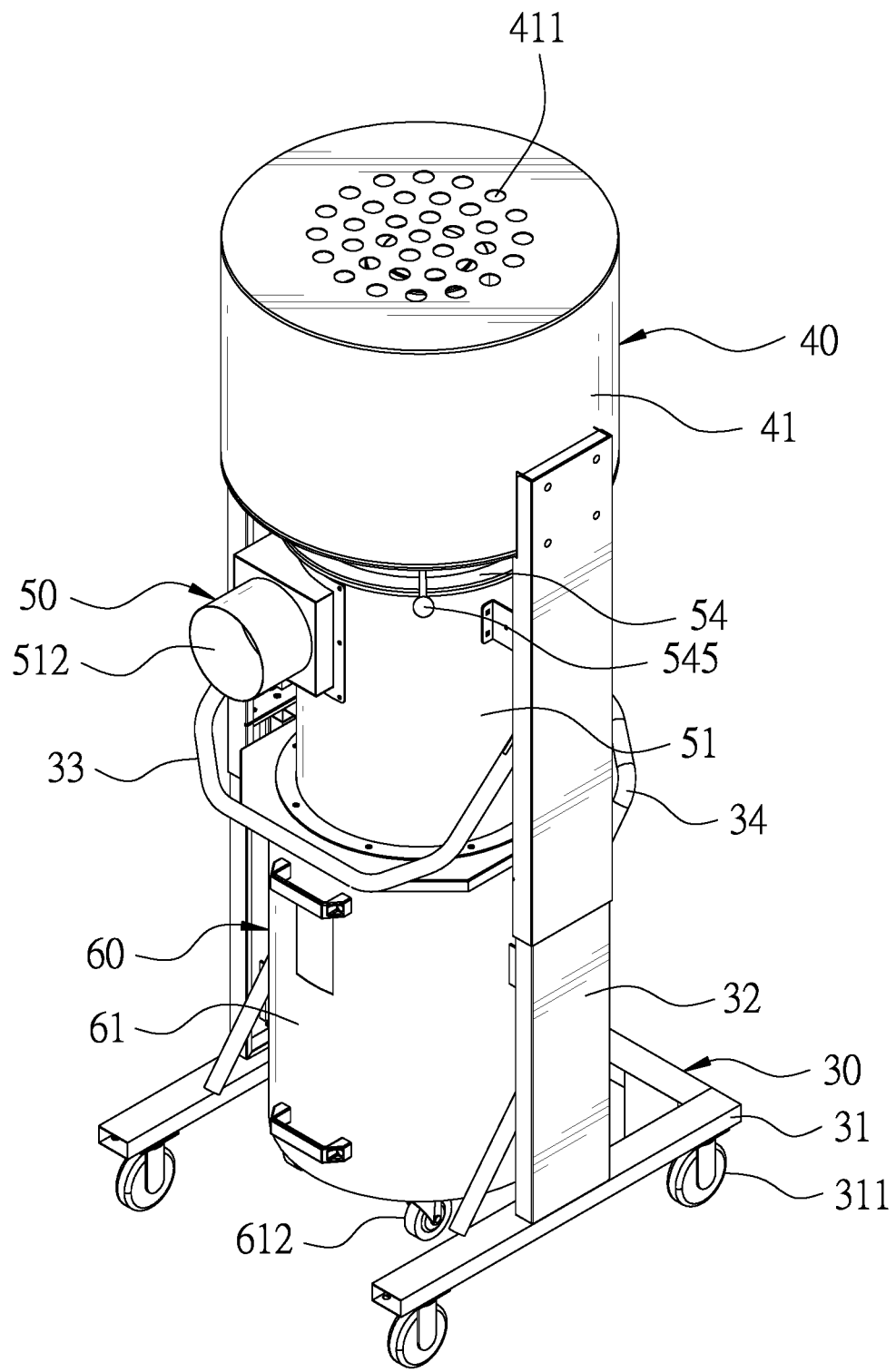
FIG. 3 is a perspective view of a preferred embodiment of the present invention, illustrating that the present invention is mainly composed of a base unit, a suction blower unit, a filter unit and a dust collecting unit.
Figure 4:
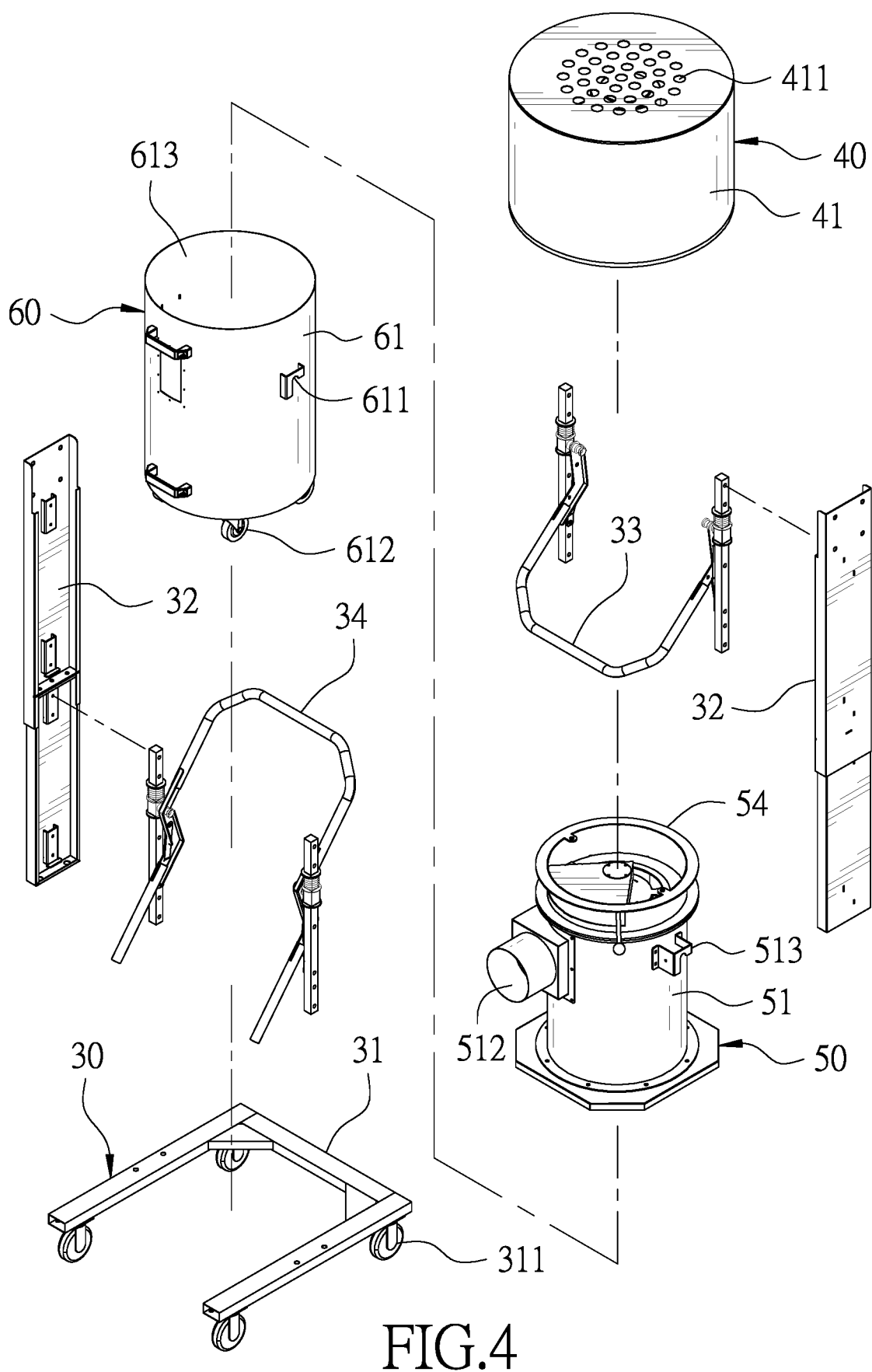
FIG. 4 is an exploded perspective view of the preferred embodiment of the present invention, illustrating that the base unit includes a base, two posts, a first quick-release mechanism, and a second quick-release mechanism.

Referring to FIG. 3 and FIG. 4, an upright two-stage dust collector according to a preferred embodiment of the present invention mainly comprises a base unit 30, a suction blower unit 40, a filter unit 50, and a dust collecting unit 60. The composition structure and combination space of the above units are described in detail below.

Figure 5:
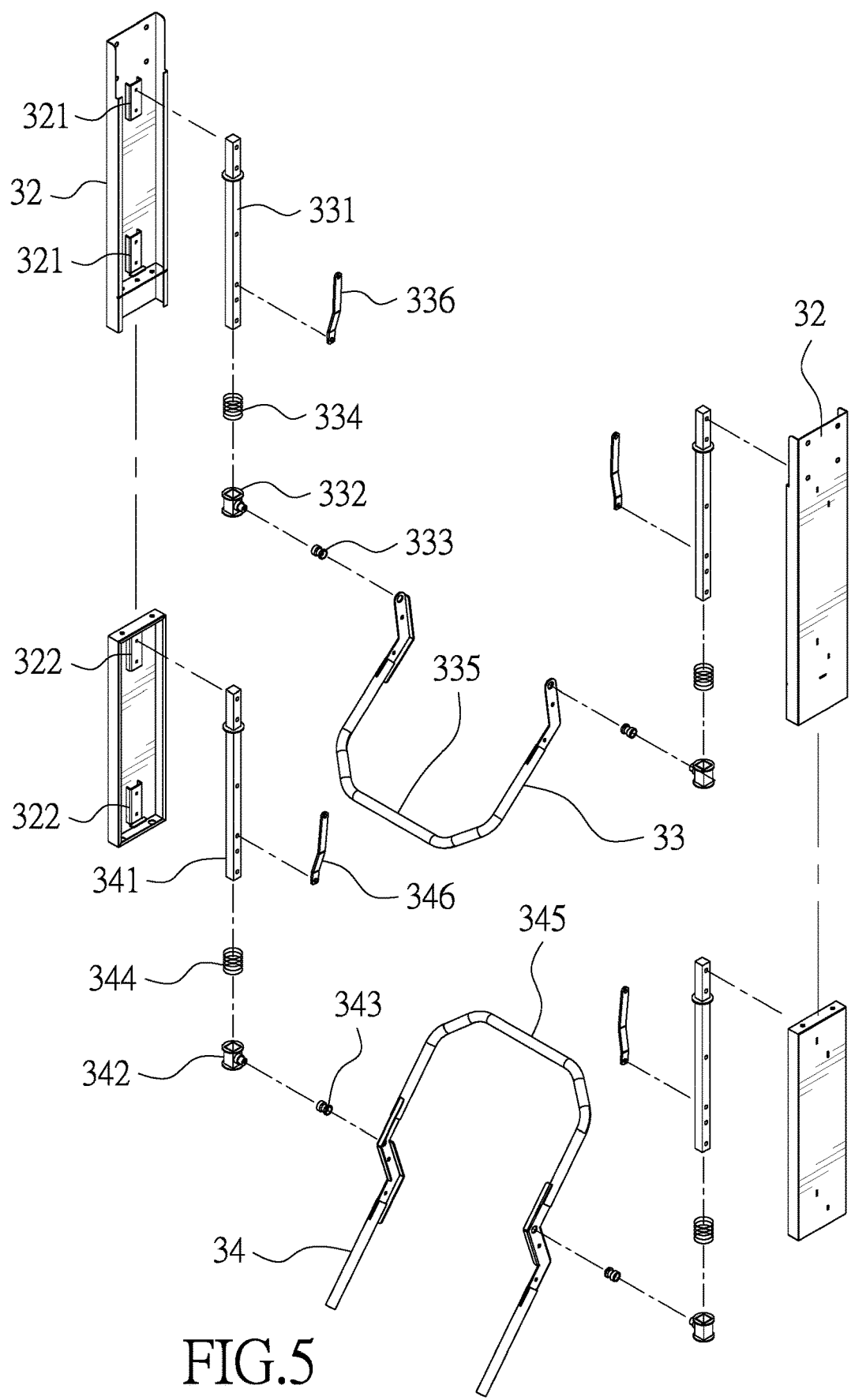
FIG. 5 is an exploded perspective view of the first quick-release mechanism and the second quick-release mechanism of the preferred embodiment of the present invention.
Figure 6:
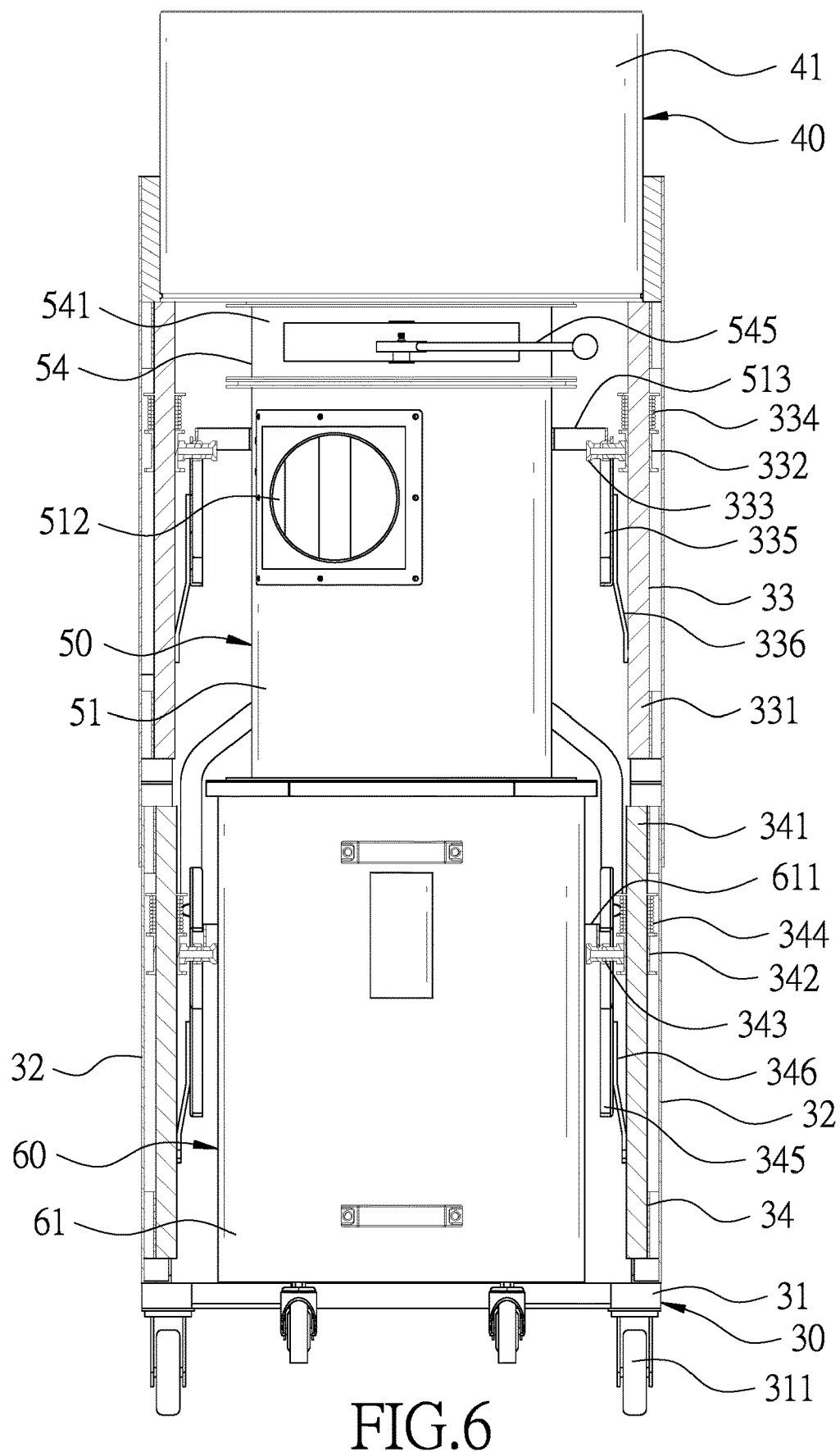
FIG. 6 is a cross-sectional view of the preferred embodiment of the present invention, illustrating the suction blower unit, the filter unit and the dust collecting unit of the present invention are arranged in an upright manner.
Figure 7:
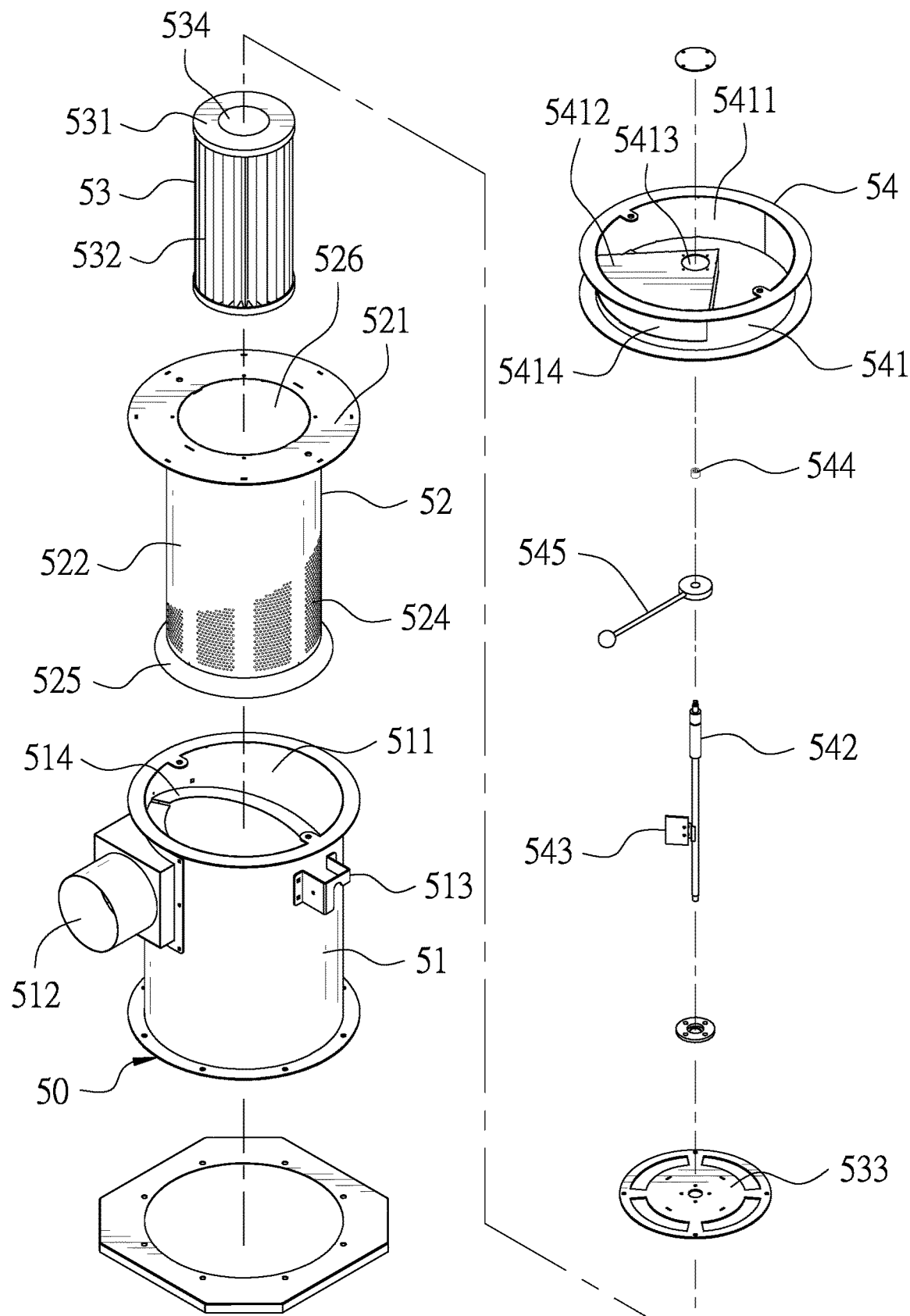
FIG. 7 is an exploded view of the preferred embodiment of the present invention, illustrating that the filter unit includes a filter body, a coarse particle dust filter cartridge, a fine particle dust filter element, and a filter element cleaning mechanism.

The base unit 30 includes a base 31, two posts 32 uprightly disposed on the left and right sides of the base 31, a first quick-release mechanism 33 disposed at a middle position of the two posts 32, and a second quick-release mechanism 34 disposed at a lower position of the two posts 32. Referring to FIG. 5 and FIG. 6, the base 31 has a U-like shape. The bottom of the base 31 is provided with a plurality of rollers 311 for the user to move the entire dust collector conveniently. The posts 32 are upright posts with a predetermined height. Two pairs of first fixing seats 321 are provided on the upper portions of the inner sides of the posts 32. Two pairs of second fixing seats 322 are provided on the lower portions of the inner sides of the posts 32. The first quick-release mechanism 33 includes two first slide rails 331 that are uprightly disposed on the inner sides of the two posts 32, two first slide sleeves 332 that are respectively sleeved onto the first slide rails 331, two first convex shafts 333 that are respectively connected to the inner sides of the first slide sleeves 332, two first elastic members 334 that are respectively sleeved onto the first slide rails 331 and provide an elastic force to the first slide sleeves 332, a first manual lever 335 that is linked with the first slide sleeves 332 and extends outward to the outside of the filter unit 50, and two first links 336 connected between the first slide rails 331 and the first manual lever 335. The upper and lower ends of the first slide rail 331 are sleevedly connected to the first fixing bases 321, and locked and fixed, respectively. The position of the first slide rail 331 corresponds to the height of the filter unit 50. The first slide sleeve 332 is sleeved onto the first slide rail 331 and can move up and down along the first slide rail 331. The first convex shaft 333 is locked on the first slide sleeve 332 to form a linkage. The first convex shafts 333 on the left and right sides can be inserted into two ears 513 of a filter body 51 described below. The first manual lever 335 is a U-like lever. The left and right ends of the first manual lever 335 are pivotally connected to the two first slide sleeves 332, respectively. Two ends of the first link 336 are axially coupled to the first slide rail 331 and the first manual lever 335 respectively, so that when the first manual lever 335 is pulled up and down, the first slide sleeve 332 can be moved up and down in a labor-saving manner using lever principle. The second quick-release mechanism 34 includes two second slide rails 341 that are uprightly disposed on the inner sides of the two posts 32, two second slide sleeves 342 that are respectively sleeved onto the second slide rails 341, two second convex shafts 343 that are respectively connected to the inner sides of the second slide sleeves 342, two second elastic members 344 that are respectively sleeved onto the second slide rails 341 and provide an elastic force to the second slide sleeves 342, a second manual lever 345 that is linked with the second slide sleeves 342 and extends outward to the outside of the dust collecting unit 60, and two second links 346 connected between the second slide rails 341 and the second manual lever 345. The upper and lower ends of the second slide rail 341 are sleevedly connected to the second fixing bases 322, and locked and fixed, respectively. The position of the second slide rail 341 corresponds to the height of the dust collecting unit 60. The second slide sleeve 342 is sleeved onto the second slide rail 341 and can move up and down along the second slide rail 341. The second convex shaft 343 is locked to the second slide sleeve 342 to form a linkage. The second convex shafts 343 on the left and right sides can be inserted into two ears 611 of a dust collecting cylinder 61 described below. The second manual lever 345 is a U-like lever. The left and right ends of the second manual lever 345 are pivotally connected to the two second slide sleeves 342, respectively. Two ends of the second link 346 are axially coupled to the second slide rail 341 and the second manual lever 345 respectively, so that when the second manual lever 345 is pulled up and down, the second slide sleeve 342 can be moved up and down in a labor-saving manner using lever principle.

Figure 8:
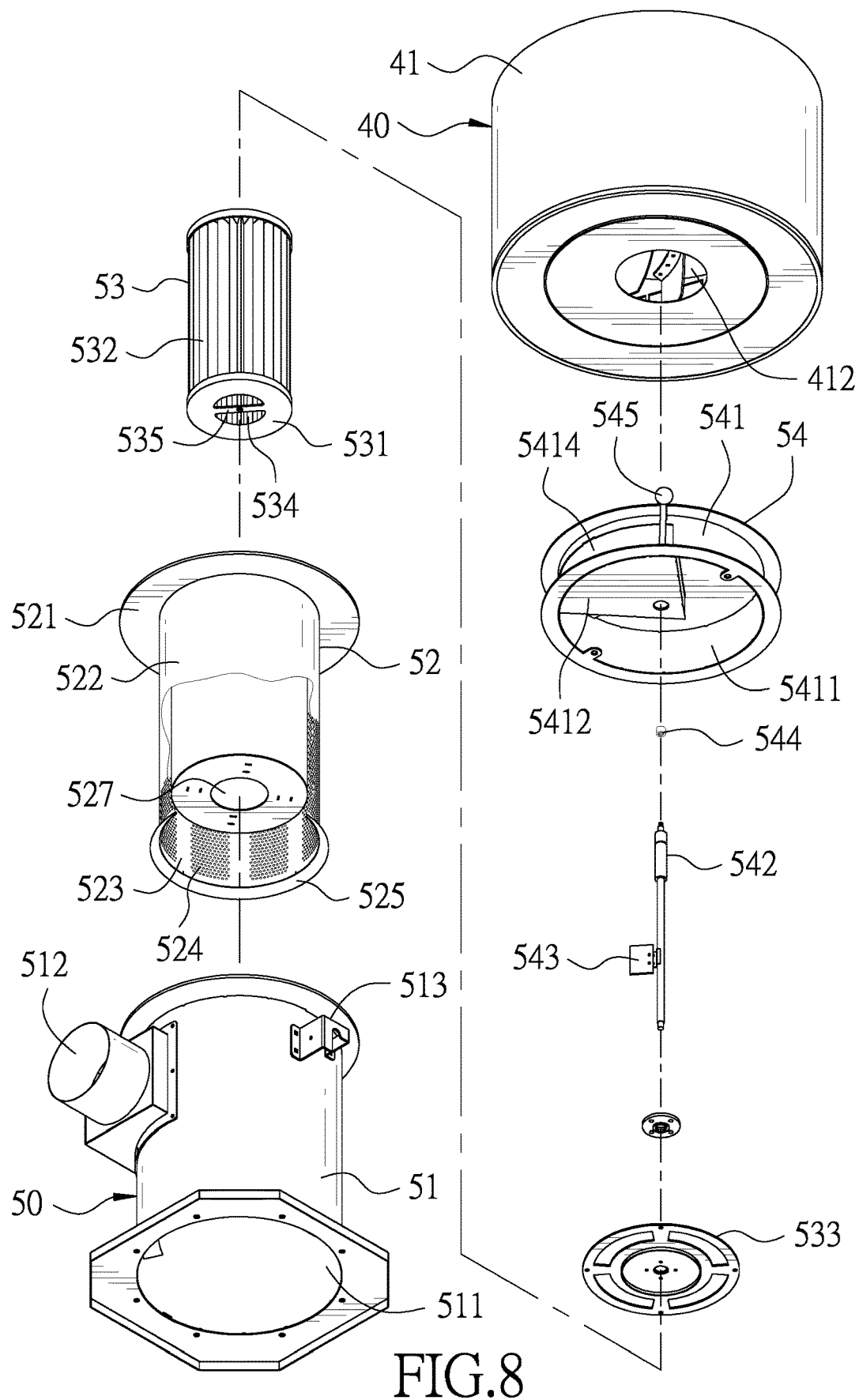
FIG. 8 is another exploded view of FIG. 7 viewed from the bottom, illustrating the bottom ends of the coarse particle dust filter cartridge and the fine particle dust filter element, and an suction passage provided at the bottom of the suction blower unit.
Figure 9:
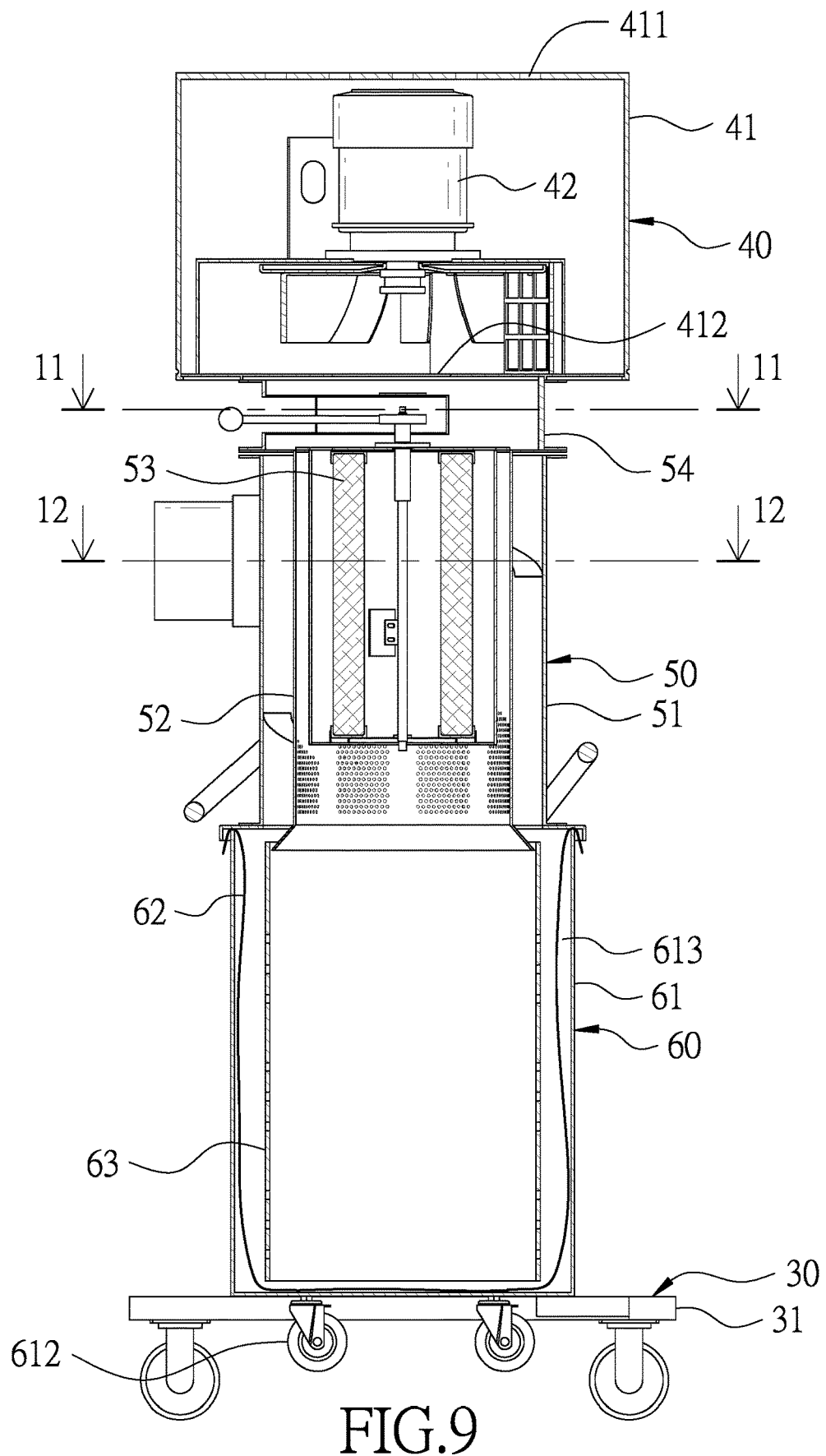
FIG. 9 is a cross-sectional view of the preferred embodiment of the present invention, illustrating the internal structures of the suction blower unit, the filter unit and the dust collecting unit after assembled.
Figure 10:
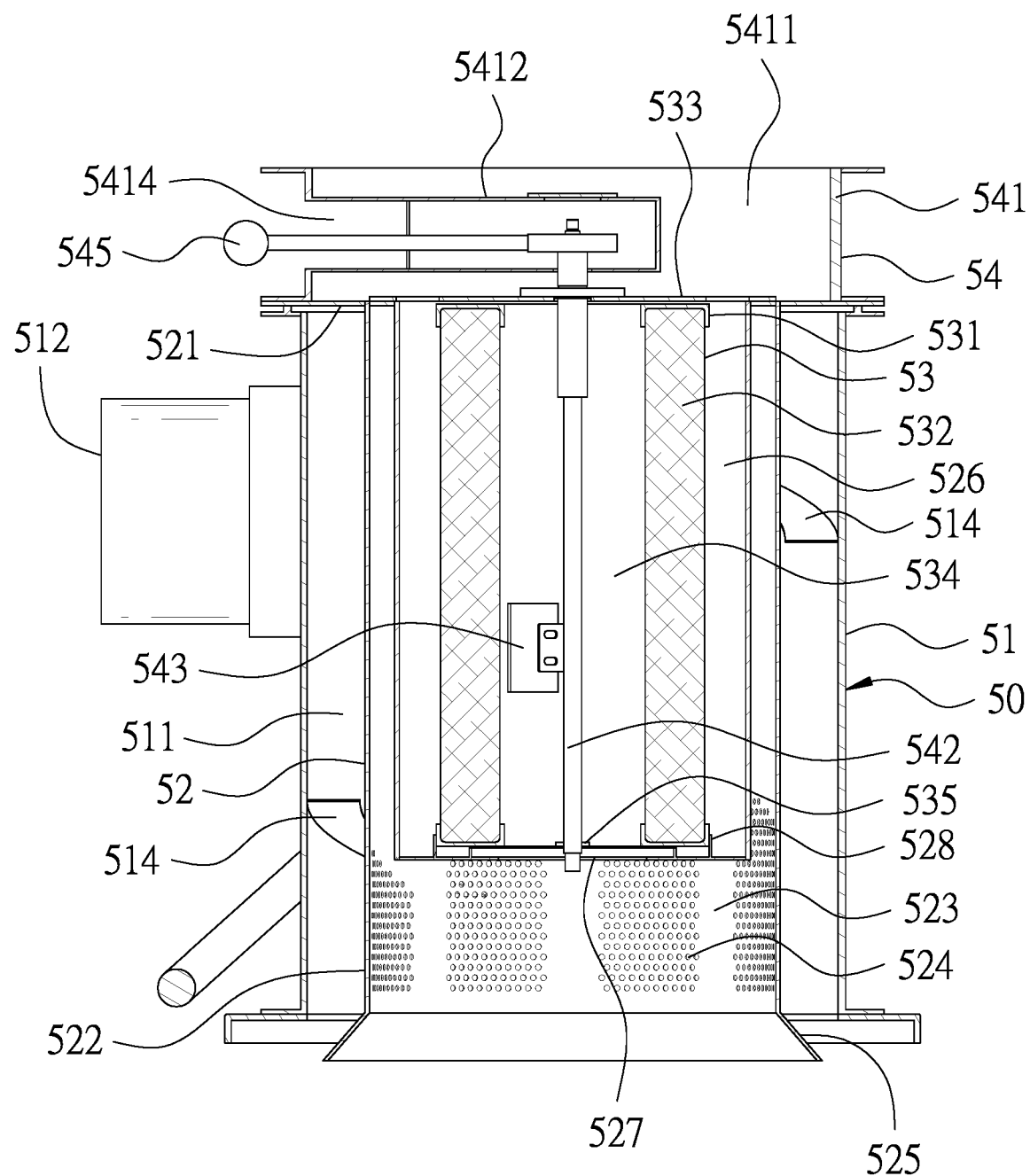
FIG. 10 is an enlarged cross-sectional view of the interior of the filter unit of the preferred embodiment of the present invention, illustrating that the bottom end of the fine particle dust filter element is air-tightly fitted inside the coarse particle dust filter cartridge.

Referring to FIG. 8 and FIG. 9, the suction blower unit 40 includes a suction blower body 41 disposed at the upper ends of the two posts 32 and an air blower 42 disposed inside the suction blower body 41. The top of the suction blower body 41 is formed with a plurality of vents 411. The bottom of the suction blower body 41 is formed with a suction passage 412 corresponding in position to the air blower 42. Starting the air blower 42 enables the suction passage 412 to generate a negative pressure suction force.

Referring to FIGS. 7-10, the filter unit 50 includes a filter body 51 disposed between the two posts 32 and under the suction blower body 41, a coarse particle dust filter cartridge 52 disposed in the filter body 51, a fine particle dust filter element 53 disposed in the coarse particle dust filter cartridge 52, and a filter element cleaning mechanism 54 disposed at the upper end of the filter body 51. The interior of the filter body 51 is hollow to form a first accommodating chamber 511. The exterior of the filter body 51 is provided with an air inlet 512 communicating with the first accommodating chamber 511 for introducing outside air. Two ears 513 are provided on the left and right sides of the exterior of the filter body 51. The two ears 513 are adapted for insertion of the first convex shafts 333 of the first quick-release mechanism 33, thereby supporting the entire filter body 51. A spiral deflector 514 is fixedly connected to the inner wall of the first accommodating chamber 511 of the filter body 51. The deflector 514 allows the air sucked into the first accommodating chamber 511 to contact the outer peripheral wall of the coarse particle dust filter cartridge 52 in a spiral manner. The coarse particle dust filter cartridge 52 is a dual-layer cylinder, namely, an inner layer and an outer layer. A flange 521 is provided at the upper end of the coarse particle dust filter cartridge 52. The flange 521 is retained at the top end of the filter body 51. A cylindrical portion 522 is extended downward from the outer periphery of the coarse particle dust filter cartridge 52. The cylindrical portion 522 is coaxially inserted in the first accommodating chamber 511. The outer periphery of the cylindrical portion 522 is spaced apart from the inner wall of the filter body 51 by a certain distance. The interior of the cylindrical portion 522 is hollow to form a second accommodating chamber 523. The outer peripheral surface of the lower end of the cylindrical portion 522 is formed with a plurality of filter hole groups 524 communicating with the second accommodating chamber 523. The filter hole groups 524 are spirally distributed according to the direction of the deflector 514, so that when the air entering the first accommodating chamber 511 is in contact with the outer peripheral wall of the cylindrical portion 522, coarse particles of dust will be filtered by the filter hole groups 524 and fall down due to their own weight. The lower end of the cylindrical portion 522 is provided with a flared beveled conical portion 525. The beveled conical portion 525 can prevent the fallen coarse dust from being sucked into the second accommodating chamber 523. The center of the upper end of the coarse particle dust filter cartridge 52 is formed with a seat hole 526 communicating with the suction passage 412. The center of the bottom of the seat hole 526 is formed with an intermediate through hole 527 communicating with the second accommodating chamber 523. The bottom wall of the seat hole 526 is provided with an annular positioning flange 528. The fine particle dust filter element 53 has a filter element frame 531, a filter material 532 surrounding the periphery of the filter element frame 531, and a retaining disc 533 locked at the upper end of the filter element frame 531. The filter element frame 531 is coaxially inserted into the seat hole 526 of the coarse particle dust filter cartridge 52. The bottom end of the filter element frame 531 can be quickly and air-tightly fitted with the positioning flange 528. The top end of the filter element frame 531 is locked and fixed on the flange 521 of the coarse particle dust filter cartridge 52 through the retaining disc 533. The filter material 532 is a high-efficiency particulate air filter (HEPA), which can effectively remove fine dust in the air. A core hole 534 is formed inside the fine particle dust filter element 53 by being surrounded by the filter material 532. The core hole 534 is in communication with the second accommodating chamber 523 via the intermediate through hole 527. A rib portion 535 is horizontally provided at the center of the bottom end of the filter element frame 531. The retaining disc 533 is locked to the upper end of the filter element frame 531 to close the upper end of the core hole 534, so that the air entering the core hole 534 can only enter the seat hole 526 by penetrating the filter material 532.

Figure 11:
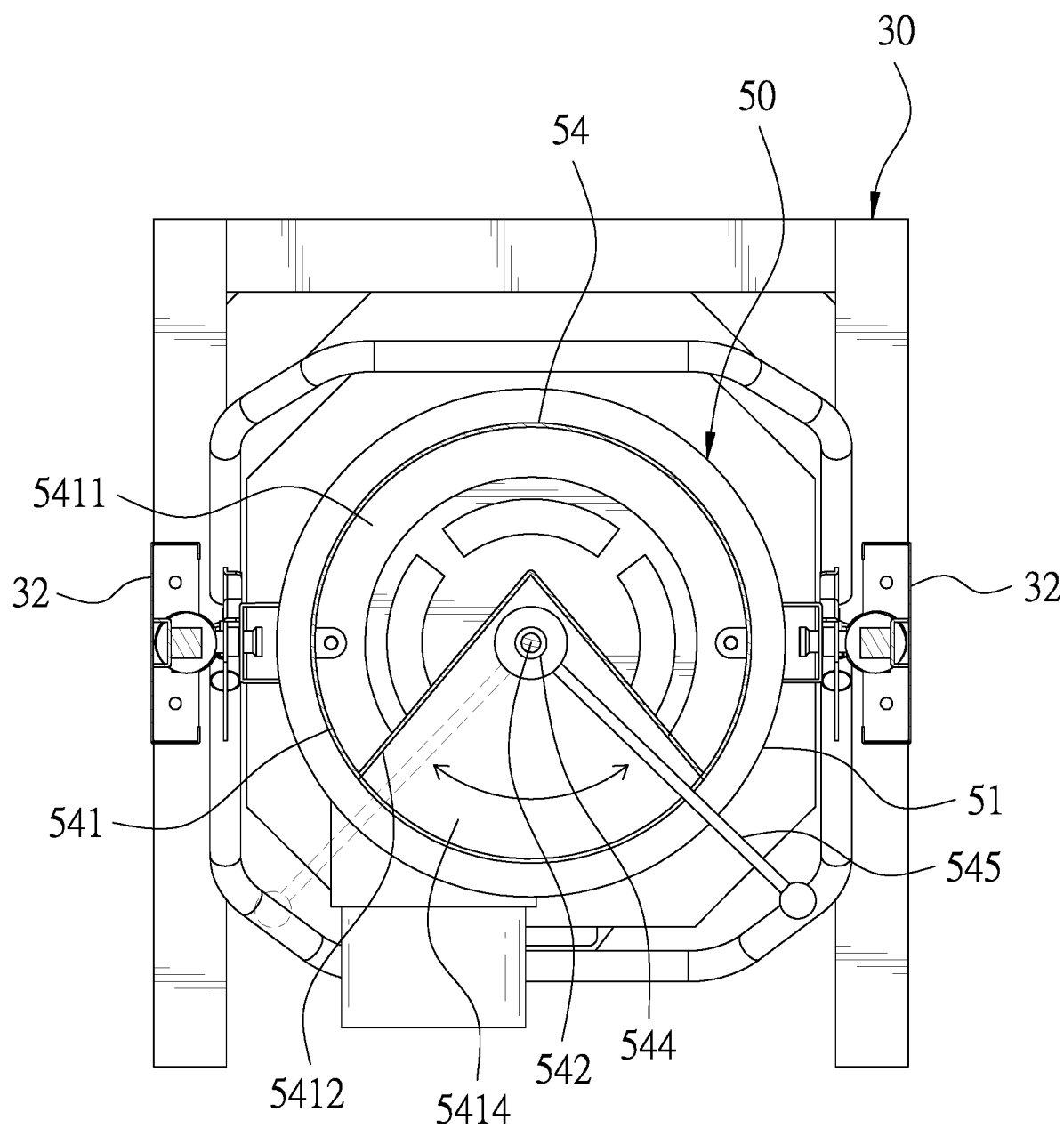
FIG. 11 is a cross-sectional view taken along line 11-11 of FIG. 9, illustrating that the filter element cleaning mechanism includes a shaft and a manual trigger that can swing back and forth to drive the shaft to rotate.
Figure 12:
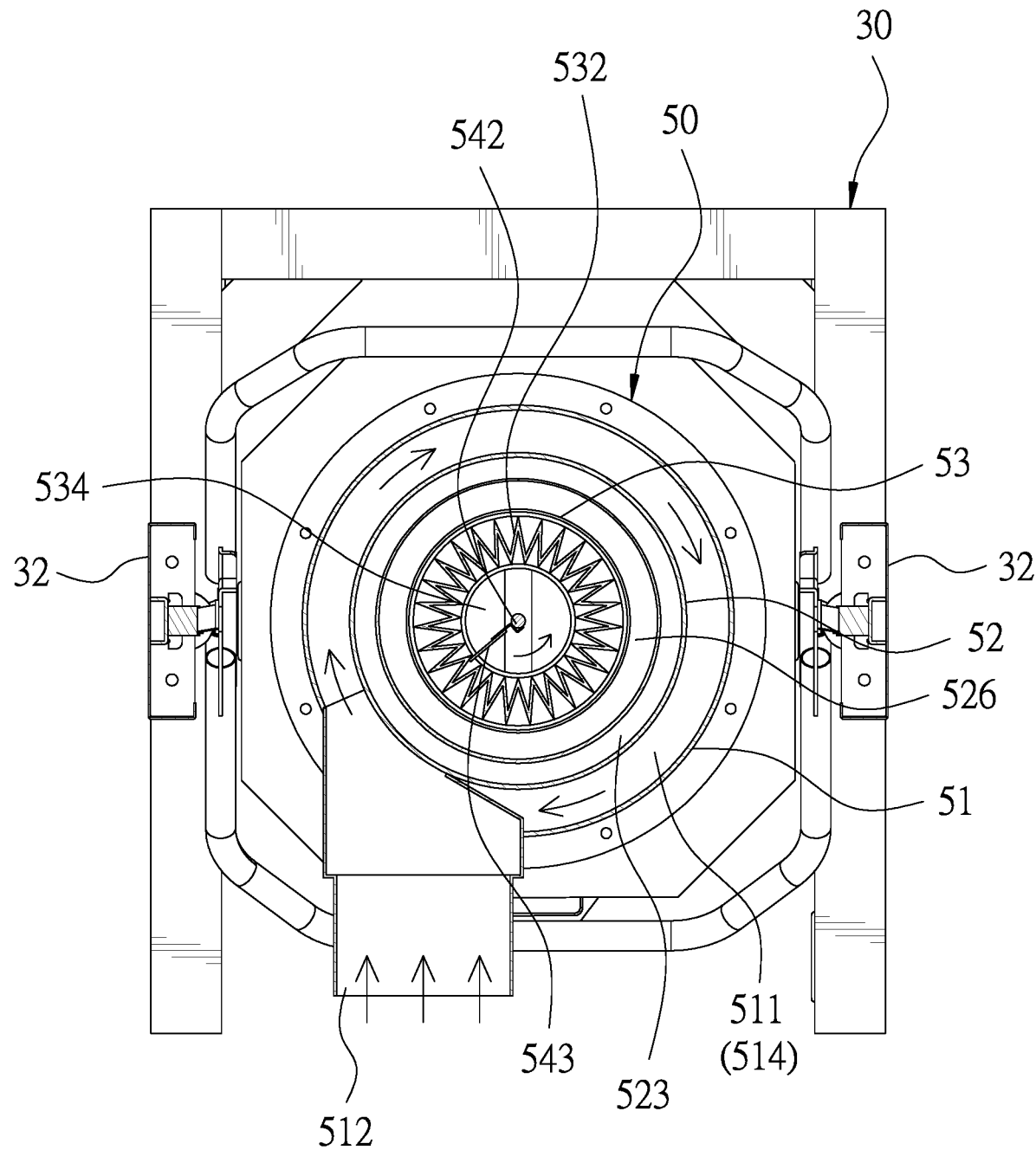
FIG. 12 is a cross-sectional view taken along line 12-12 of FIG. 9, illustrating that the filter element cleaning mechanism has a cleaning piece disposed on the shaft, and rotating the shaft can drive the cleaning piece to clean the inner surface of the fine particle dust filter element.

Referring to FIG. 11 and FIG. 12, the filter element cleaning mechanism 54 has an annular seat 541 disposed at the upper end of the filter body 51, a shaft 542 that is axially disposed at the center of the annular seat 541 and extends downward to the core hole 534 of the fine particle dust filter element 53, a cleaning piece 543 that is fixedly connected to a lower portion of the shaft 542 and is in contact with the inner surface of the filter material 532, a one-way bearing 544 disposed at the upper end of the shaft 542, and a manual trigger 545 that is fitted on the one-way bearing 544 and laterally extends out of the annular seat 541. The annular seat 541 is a ring-shaped seat body. The interior of the annular seat 541 is formed with a perforation 5411 having a substantially ¾ circular arc shape. Upper and lower ends of the perforation 5411 communicate with the suction passage 412 and the seat hole 526, respectively. The interior of the annular seat 541 is provided with a solid portion 5412 having a substantially ¼ circular arc shape. The central angle end of the solid portion 5412 is formed with a shaft hole 5413 through which the shaft 542 passes. The outer periphery of the solid portion 5412 is formed with a groove 5414 for the manual trigger 545 to make a swing greater than 45 degrees. The lower end of the shaft 542 extends to the rib portion 535 of the fine particle dust filter element 53 and forms a shaft connection. Swinging the manual trigger 545 can simultaneously drive the shaft 542 and the cleaning piece 543 to rotate. Since the cleaning piece 543 is in contact with the surface of the filter material 532, turning the cleaning piece 543 can remove the dust attached to the inner surface of the filter material 532. The manual trigger 545 can drive the shaft 542 to rotate a certain angle when it is turned forward. When the manual trigger 545 rotates in the reverse direction, the shaft 542 will not be driven through the one-way bearing 544. In this way, as long as the manual trigger 545 is repeatedly turned back and forth several times, the cleaning piece 543 can rotate 360 degrees to clean the inner surface of the filter material 532.

Referring to FIG. 4 and FIG. 9, the dust collecting unit 60 includes a dust collecting cylinder 61 disposed between the two posts 32 and under the filter body 51. The dust collecting cylinder 61 is provided with two ears 611 at the left and right sides thereof. The bottom of the dust collecting cylinder 61 is provided with a plurality of rollers 612, so that the entire dust collecting cylinder 61 can be moved on the ground conveniently. The interior of the dust collecting cylinder 61 is formed with a dust collecting chamber 613 corresponding in position to the first and second accommodating chambers 511, 523 for collecting coarse and fine particles of dust. In order to facilitate the cleaning and collection of dust, a dust collecting bag 62 can be placed inside the dust collecting chamber 613. By inserting an annular frame 63, the dust collecting bag 62 can be quickly expanded, so that the mouth of the dust collecting bag 62 is just below the first and second accommodating chambers 511, 523. In this way, coarse and fine particles of dust can smoothly drop into the dust collecting bag 62 for collection.

The above is the overall composition structure and combined space of the upright two-stage dust collector of the present invention. Then, the operation of the present invention and the technical problems to be solved are described in detail below.

Figure 13:
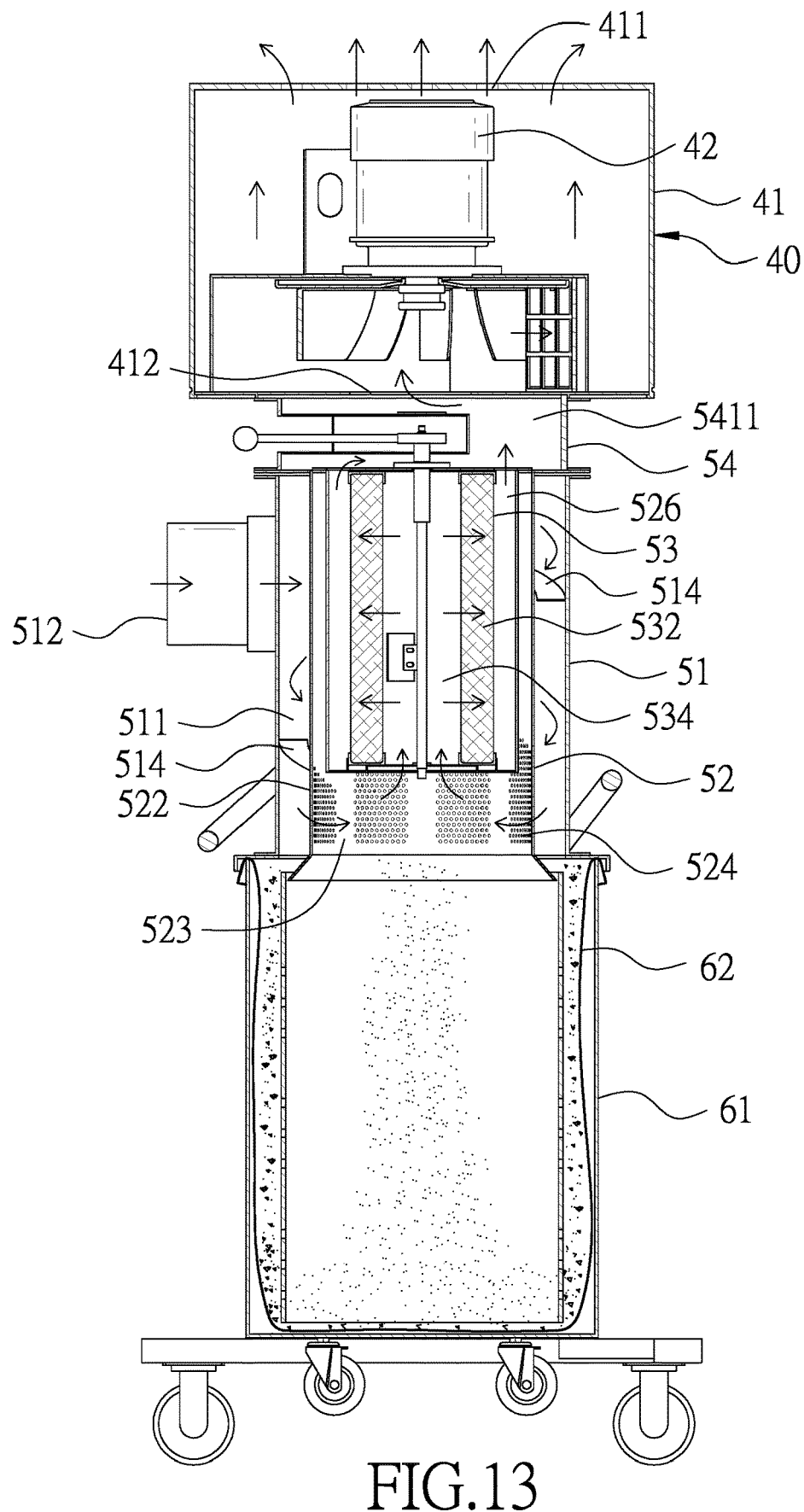
FIG. 13 is an operation view of the preferred embodiment of the present invention, illustrating that the filter body introduces the outside air to enter the coarse particle dust filter cartridge for the first filtering and dust collection and then enter the fine particle dust filter element for the second filtering and dust collection, and finally the suction blower unit exhausts the filtered air.

Referring to FIG. 12 and FIG. 13, when the user wants to use the present invention, the air blower 42 is first started to generate suction, and the outside air is drawn into the first accommodating chamber 511 through the air inlet 512 of the filter body 51. With the spiral deflector 514, the air will reach the lower end of the coarse particle dust filter cartridge 52 along the spiral path. During the frictional contact between the coarse particles in the air and the outer wall of the cylindrical portion 522, the dust falls into the dust collecting cylinder 61 due to its own weight. The filter hole groups 524 on the cylindrical portion 522 will first filter out coarse particles of dust. The air sucked into the first accommodating chamber 511 passes through the filter hole groups 524 to be filtered, thereby completing the first dust collection action. The filtered air enters the second accommodating chamber 523 through the filter hole groups 524, and then reaches the core hole 534 inside the fine particle dust filter element 53 from the second accommodating chamber 523. At this time, the air is filtered by the filter material 532 to filter out relatively fine particles of dust, and the fine particles of dust will fall into the dust collecting cylinder 61 through the second accommodating chamber 523, thereby completing the second dust collection action. After the second dust collection, the air will flow upward from the seat hole 526 to pass through the perforation 5411 of the annular seat 541 and enter the suction passage 412 of the suction blower body 41. Finally, the air is exhausted from the vents 411 of the suction blower body 41, and all filtering and dust collection actions are completed.

Figure 14:
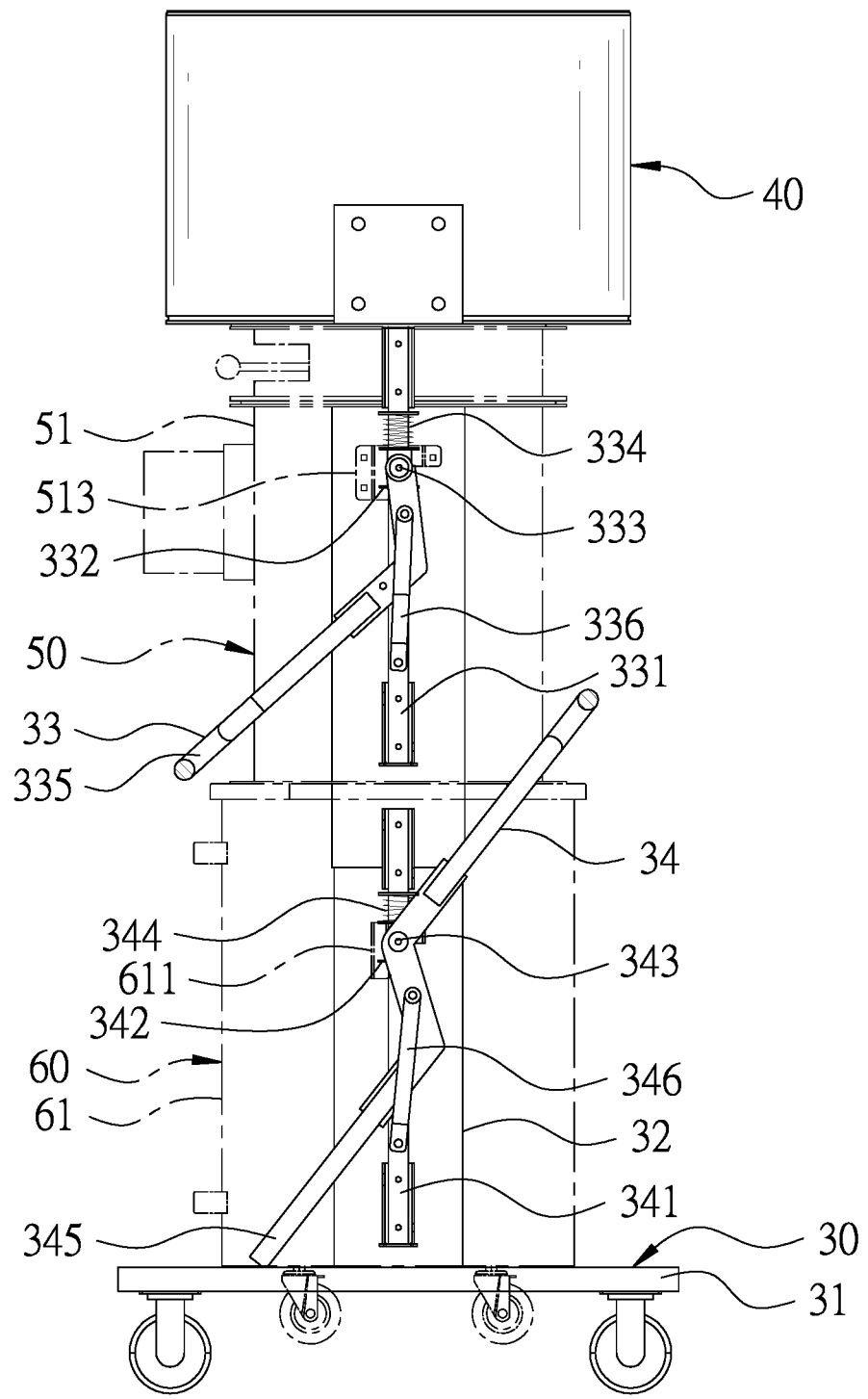
FIG. 14 is a schematic view of the preferred embodiment of the present invention, illustrating that the filter unit is fitted and supported by the first quick-release mechanism, and the dust collecting unit is fitted and supported by the second quick-release mechanism.

Referring to FIG. 14, in a combined state, the filter body 51 of the filter unit 50 is supported by the first quick-release mechanism 33. At this time, the first manual lever 335 of the first quick-release mechanism 33 is pressed downward, and the first convex shafts 333 push the filter body 51 upward to be combined with the lower end of the suction blower unit 40. The dust collecting cylinder 61 of the dust collecting unit 60 is supported by the second quick-release mechanism 34. The second manual lever 345 of the second quick-release mechanism 34 is pressed downward, and the second convex shafts 343 push the dust collecting cylinder 61 upward to be combined with the lower end of the filter body 51.

Figure 15:
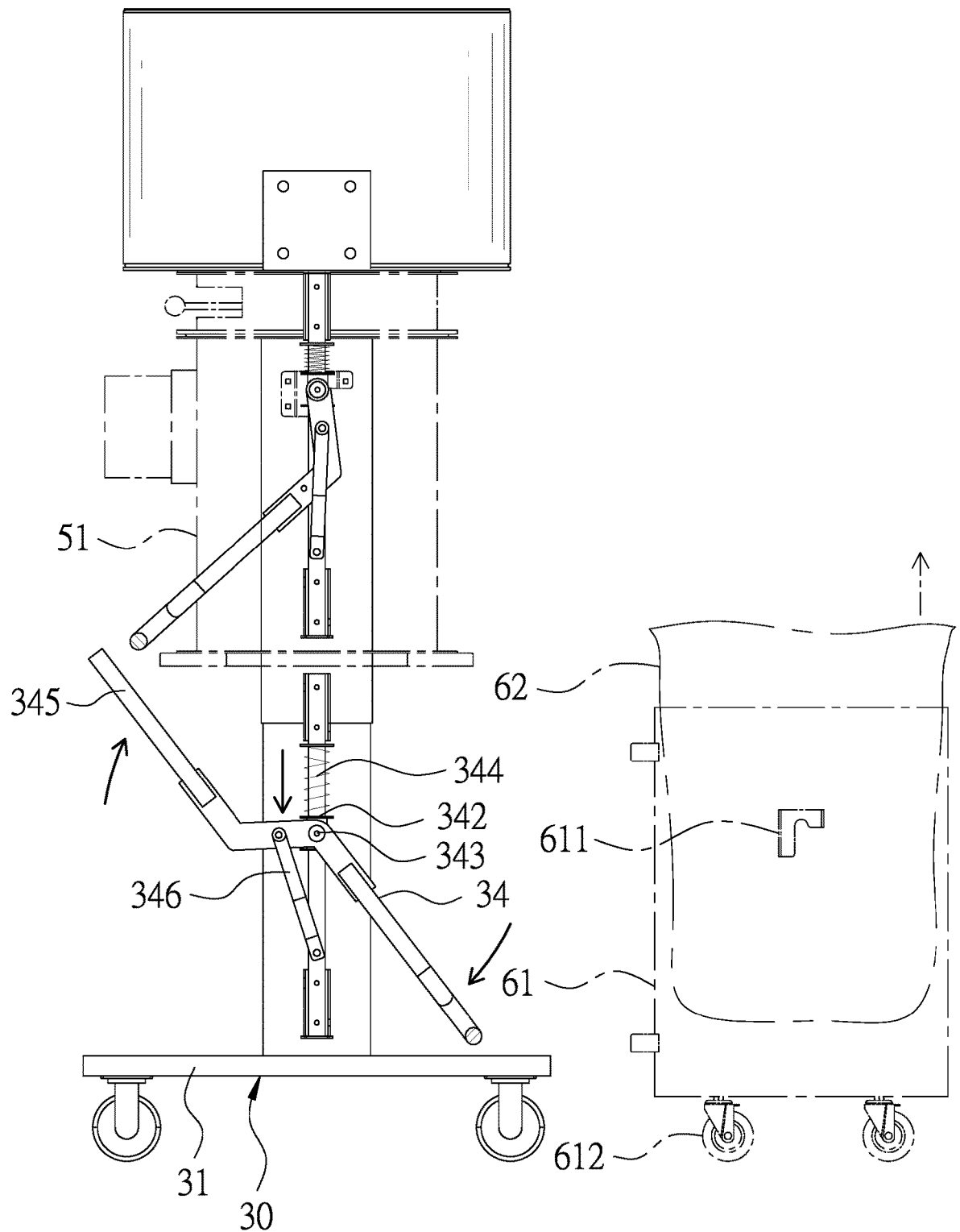
FIG. 15 is a schematic view of the preferred embodiment of the present invention, illustrating that the second quick-release mechanism is operated to disengage the dust collecting unit from the base unit and the filter unit quickly.

Referring to FIG. 15, when the user wants to replace the dust collecting bag 62 in the dust collecting cylinder 61, the second manual lever 345 of the second quick-release mechanism 34 is first pulled upward. The second slide sleeve 342 is pushed downward by the second elastic member 344 to link the second convex shaft 343 to move downward. The downward movement of the second convex shaft 343 enables the entire dust collecting cylinder 61 to disengage from the filter body 51. After the rollers 612 at the bottom of the dust collecting cylinder 61 contacts the ground, the entire dust collecting cylinder 61 can be removed from the base 31, and the user can quickly remove the dust collecting bag 62 in the dust collecting cylinder 61 for replacement.

Figure 16:
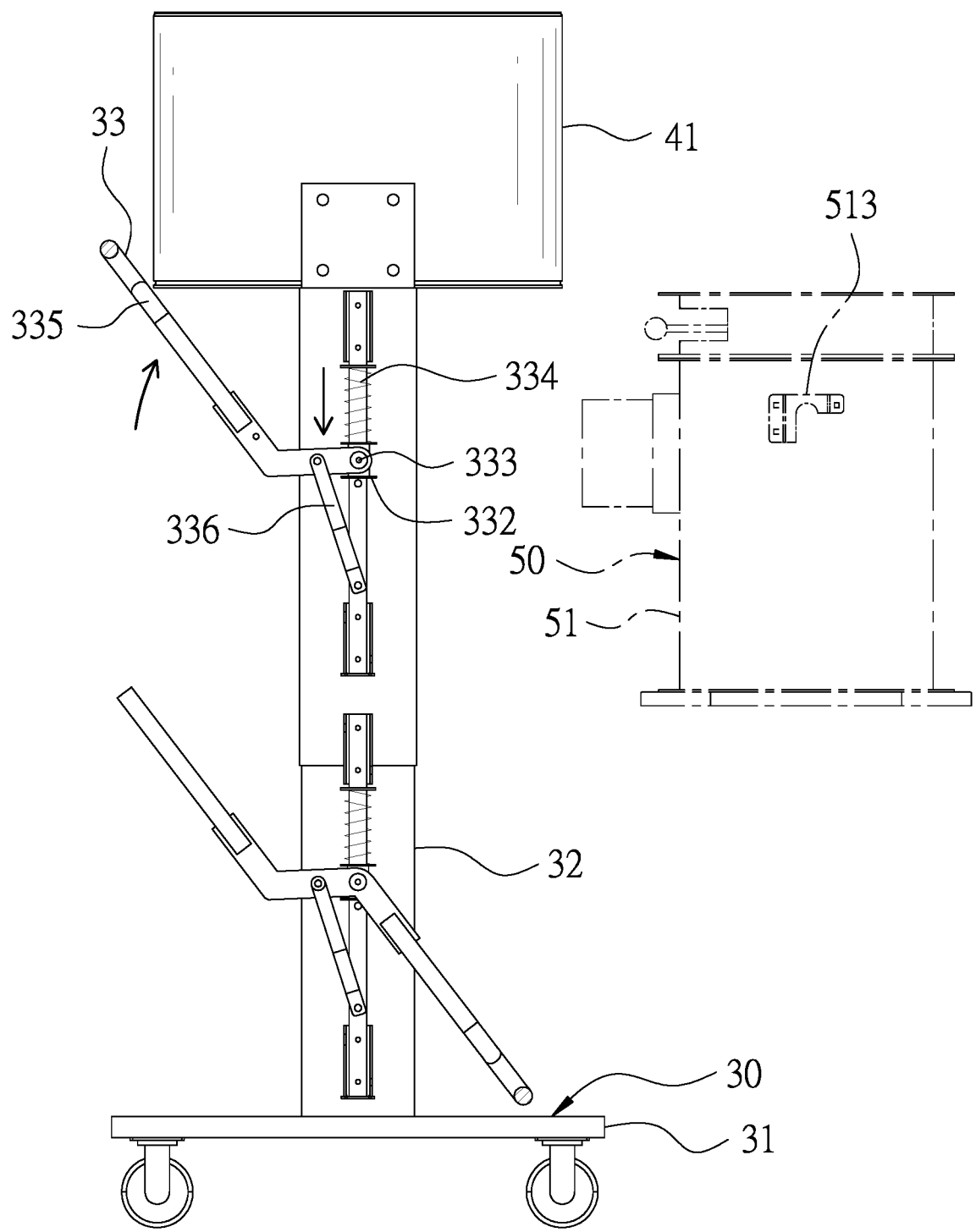
FIG. 16 is a schematic view of the preferred embodiment of the present invention, illustrating that the first quick-release mechanism is operated to disengage the filter unit from the suction blower unit quickly.

Referring to FIG. 16, when the user wants to replace the fine particle dust filter element 53 in the filter body 51, the dust collecting cylinder 61 is first detached from the base 31, and then the first manual lever 335 of the first quick-release mechanism 33 is pulled upward. The first slide sleeve 332 is pushed downward by the first elastic member 334 to link the first convex shaft 333 to move downward. The downward movement of the first convex shaft 333 enables the filter body 51 to disengage from the suction blower body 41. At this time, the entire filter unit 50 can be separated from the posts 32, and then the user can replace the filter element inside the filter unit 50.

In summary, the upright two-stage dust collector of the present invention is mainly to solve the problem that the conventional two-stage dust collector 20 is too large in volume, occupying space and leading to inconvenience in operation and use. The technical means used in the present invention is to install the suction blower unit 40, the filter unit 50 and the dust collecting unit 60 in an upright manner. The volume of the entire dust collector is minimized, so that the present invention can be appropriately placed in a small space and has convenience in installation, transportation and operation. In addition, in order to achieve a two-stage dust collection effect, the composition structure and air passage of the filter unit 50 are also a major feature of the present invention. That is, the coarse particle dust filter cartridge 52 and the fine particle dust filter element 53 are coaxially arranged inside the filter body 51, so that the inhaled air can be sequentially filtered by the coarse particle dust filter cartridge 52 for performing the first filtering and dust collection, and then the filtered air is guided to the fine particle dust filter element 53 for performing the second filtering and dust collection. In this way, the present invention can allow the inhaled air in a single filter body 51 to complete the dust collection for coarse and fine particles of dust, and coarse and fine particles of dust can also be centrally processed by a single dust collecting cylinder 61, which can effectively save the cost of the dust collector and achieve the effect of convenient cleaning. In addition, the present invention has a fast and convenient cleaning effect on the fine particle dust filter element 53. In the present invention, the filter element cleaning mechanism 54 is provided on the filter unit 50. The filter element cleaning mechanism 54 is provided with the manual trigger 545 that can drive the cleaning piece 543 to rotate in a single direction. The user stands at the front of the dust collector and performs the operation, after repeatedly swinging the manual trigger 545 several times, the internal cleaning piece 543 can complete a 360-degree rotation to perform a flapping and cleaning action on the fine particle dust filter element 53, so that the fine particle dust filter element 53 can be maintained in a state of the best filtering quality. Finally, the present invention is provided with the first quick-release mechanism 33 and the second quick-release mechanism 34 on the two posts 32, respectively. The user operates the second manual lever 345 of the second quick-release mechanism 34 to control the dust collecting cylinder 61 to be separated from the filter body 51 quickly. When the user wants to replace and clean the dust collecting bag 62, he/she can quickly take out the dust collecting bag 62 for replacement. The user operates the first manual lever 335 of the first quick-release mechanism 33 to control the filter body 51 to be separated from the suction blower body 41 quickly. When the user wants to replace and install the fine particle dust filter element 53, the present invention also has the effect of facilitating disassembly and assembly.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:
1. An upright two-stage dust collector, comprising:
a base unit, including a base and two posts uprightly disposed on left and right sides of the base;
a suction blower unit, including a suction blower body disposed at upper ends of the two posts and an air blower disposed inside the suction blower body, a bottom of the suction blower body being formed with a suction passage corresponding in position to the air blower, starting the air blower enabling the suction passage to generate a negative pressure suction force;
a filter unit, including a filter body disposed between the two posts and under the suction blower body, a coarse particle dust filter cartridge disposed in the filter body and a fine particle dust filter element disposed in the coarse particle dust filter cartridge, an interior of the filter body being hollow to form a first accommodating chamber, an exterior of the filter body being provided with an air inlet communicating with the first accommodating chamber for introducing outside air, the coarse particle dust filter cartridge being mounted and fixed in the filter body, a lower end of the coarse particle dust filter cartridge being provided with a cylindrical portion extending into the first accommodating chamber, an interior of the cylindrical portion being hollow to form a second accommodating chamber, an outer peripheral surface of the cylindrical portion being formed with a plurality of filter hole groups communicating with the second accommodating chamber, a center of an upper end of the coarse particle dust filter cartridge being formed with a seat hole, an upper end of the seat hole communicating with the suction passage, the fine particle dust filter element being coaxially inserted in the seat hole, a filter material surrounding an outer periphery of the fine particle dust filter element, an interior of the filter material being hollow to form a core hole, a lower end of the core hole communicating with the second accommodating chamber;
a dust collecting unit, including a dust collecting cylinder disposed between the two posts and under the filter body, an interior of the dust collecting cylinder being formed with a dust collecting chamber corresponding in position to the first and second accommodating chambers.

2. The upright two-stage dust collector as claimed in claim 1, wherein the filter unit further includes a filter element cleaning mechanism, the filter element cleaning mechanism has an annular seat disposed at an upper end of the filter body, a shaft that is axially disposed at a center of the annular seat and extends downward to the core hole of the fine particle dust filter element, a cleaning piece that is fixedly connected to a lower portion of the shaft and is in contact with an inner surface of the filter material, a one-way bearing disposed at an upper end of the shaft, and a manual trigger that is fitted on the one-way bearing and laterally extends out of the annular seat.

3. The upright two-stage dust collector as claimed in claim 2, wherein the annular seat is a ring-shaped seat body, an interior of the annular seat is formed with a perforation having a substantially ¾ circular arc shape, upper and lower ends of the perforation communicate with the suction passage and the seat hole respectively, the interior of the annular seat is provided with a solid portion having a substantially ¼ circular arc shape, a central angle end of the solid portion is formed with a shaft hole through which the shaft passes, and an outer periphery of the solid portion is formed with a groove for the manual trigger to make a swing greater than 45 degrees.

4. The upright two-stage dust collector as claimed in claim 1, wherein a spiral deflector is fixedly connected to an inner wall of the first accommodating chamber of the filter body, and the filter hole groups on the cylindrical portion of the coarse particle dust filter cartridge are spirally distributed corresponding in direction to the deflector.

5. The upright two-stage dust collector as claimed in claim 1, wherein a lower end of the cylindrical portion of the coarse particle dust filter cartridge is provided with a flared beveled conical portion.

6. The upright two-stage dust collector as claimed in claim 1, wherein a center of a bottom of the seat hole is formed with an intermediate through hole communicating with the second accommodating chamber.

7. The upright two-stage dust collector as claimed in claim 1, wherein the coarse particle dust filter cylinder has a positioning flange protruding from a bottom of the seat hole for airtight fit of a bottom end of the fine particle dust filter element.

8. The upright two-stage dust collector as claimed in claim 1, wherein the fine particle dust filter element has a filter element frame and a retaining disc, the filter material is arranged around an outer periphery of the filter element frame, so that the core hole is formed inside the fine particle dust filter element, the retaining disc is locked at an upper end of the filter element frame to close an upper end of the core hole, and the fine particle dust filter element is locked and fixed to the coarse particle dust filter cartridge by the retaining disc.

9. The upright two-stage dust collector as claimed in claim 1, wherein left and right sides of the filter body are provided with two ears, the base unit further includes a first quick-release mechanism, the first quick-release mechanism includes two first slide rails that are uprightly disposed on inner sides of the two posts and correspond in height to the filter body, two first slide sleeves that are respectively sleeved onto the first slide rails to move up and down, two first convex shafts that are respectively connected to inner sides of the first slide sleeves and can be inserted into the two ears of the filter body, two first elastic members that are respectively sleeved onto the first slide rails and provide an elastic force to the first slide sleeves, a first manual lever extending outward to an outside of the filter unit and having two ends pivotally connected to the first slide sleeves, and two first links connected between the first slide rails and the first manual lever.

10. The upright two-stage dust collector as claimed in claim 1, wherein left and right sides of the dust collecting cylinder are provided with two ears, the base unit further includes a second quick-release mechanism, the second quick-release mechanism includes two second slide rails that are uprightly disposed on inner sides of the two posts and correspond in height to the dust collecting cylinder, two second slide sleeves that are respectively sleeved onto the second slide rails to move up and down, two second convex shafts that are respectively connected to inner sides of the second slide sleeves and can be inserted into the two ears of the dust collecting cylinder, two second elastic members that are respectively sleeved onto the second slide rails and provide an elastic force to the second slide sleeves, a second manual lever extending outward to an outside of the dust collecting cylinder and having two ends pivotally connected to the second slide sleeves, and two second links connected between the second slide rails and the second manual lever.

\* \* \* \* \*